J. S. & I. ROWELL.
Seeder and Cultivator.
No. 78,833.
Patented June 9, 1868.
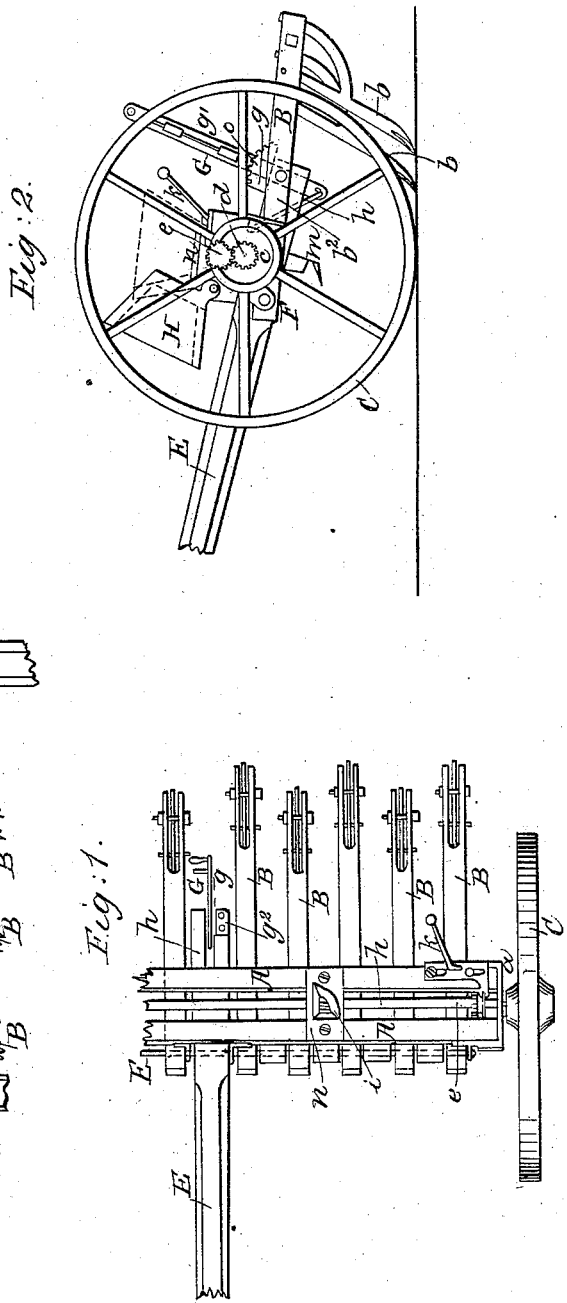

United States Patent Office.

J. S. ROWELL AND IRA ROWELL, OF BEAVER DAM, WISCONSIN.

Letters Patent No. 78,833, dated June 9, 1868.

IMPROVEMENT IN SEEDER AND CULTIVATOR.

The Schedule referred to in these Letters Patent and making part of the same.

TO ALL WHOM IT MAY CONCERN:

Be it known that we, J. S. ROWELL and IRA ROWELL, of Beaver Dam, in the county of Dodge, and State of Wisconsin, have invented certain new and useful Improvements in Combined Seeder and Cultivator; and we do hereby declare that the following is a full, clear, and exact description thereof, reference being had to the accompanying drawings, and to the letters of reference marked thereon, which form a part of this specification, in which—

Figure 1 represents a half plan view of a cultivator with our improvements attached, Figure 2 a side view of the same, and Figure 3 a vertical transverse section through the hub and hollow axle of the driving-wheel.

The improvements claimed under this patent consist—

First, in making the inside of the hub of the driving-wheel conical for a sufficient part of its length to receive and bear upon the hollow axle, and having the spindle, which carries the gear-wheel and linchpin, firmly fastened within it, and passing through the hollow axle.

Secondly, in combining the hollow axle and casting which unites the ends of the frame-pieces, so as to form an end-piece for the frame and a bearing for the driving-wheel and spindle of the gear which drives the seeding-wheels.

Thirdly, the arrangement of the driving-gear and linchpin on the inside of the frame and under the hopper, whereby they are protected from the dirt and sand which fall from the driving-wheel.

Fourthly, in the employment of a ratchet-lever, pivoted to the rear extremity of the tongue, and connected by an elbow-joint or link to the frame, for the purpose of elevating the cultivator-teeth, and bringing the draught nearer to the team, the operation being assisted by the weight of the frame and hopper, when thrown forward, partially balancing that of the bars and teeth.

Fifthly, in distributing the seed back of the draught-rod and between the cultivator-bars, which enables the bars to be attached to the front part of the frame.

To enable others skilled in the art to make and use our invention, we will proceed to describe it.

A A represent the frame-pieces of the cultivator, which are united at each end by the end-piece and hollow axle $a$. This hollow axle is fastened securely to the frame, and is made conical upon its outer surface, to enter a corresponding opening in the hub, $c$, of the driving-wheel C, which revolves upon it. This opening extends a little more than half way through the hub, in the remainder of the length of which is fastened the spindle D, which has upon it a gear, $d$, giving motion to the shaft, which carries the seeding-wheels through the pinion $e$. The spindle D passes through and bears in the hollow axle $a$, and the gear $d$ and linchpin $d^2$ are fastened upon its inner end, within the frame, and protected from the dirt and sand which fall from the wheels in their revolution. By this arrangement a double bearing is afforded for the driving-wheel and spindle, as well as a desirable position for the gear $d$.

The tongue E is attached to the draught-rod F at the front of the frame. To the draught-rod are likewise attached the front ends of the cultivator-bars B, which bars rest upon the loops $b^2$, (which are fastened to the back piece of the frame,) and have the teeth $b$ pivoted to them near their rear ends.

A lever, G, is pivoted to the rear end of the tongue, and is connected at its lower end to the frame by the elbow-joint or link $h$. By moving the lever, the cultivator-bars and teeth are raised at pleasure.

A pawl, $g^1$, on the lever, working in a ratchet, $g^2$, fastened to the tongue, holds the lever in any desired position. The weight of the hopper H and front part of the frame facilitates this operation, by serving as a partial counterbalance to that of the bars.

The shaft $h$ revolves between the frames, and has a bearing on each end in the upper part of the hollow axle $a$. It receives motion from the spindle, D, of the driving-wheel, through the gear-wheel $d$ and pinion $e$. The shipper $k$ throws the shaft into or out of gear at pleasure. The shaft $h$ carries seeding-wheels $l$, which receive the seed from the hopper H through the openings $l^2$, and distribute it to the spouts $m$, which are arranged between the cultivator-bars and back of the draught-rod.

The openings $l^2$ are formed in blocks $n$, immediately beneath the bottom of the hopper H. The sides of the openings are bevelled, so as to direct the seed upon the seeding-wheels, and the openings in the bottom of the hopper are immediately above those on the block $n$.

It will be seen that the shipper $k$ has a weight on its end, which holds it firmly in or out of gear without the use of springs or notches, and when the shaft $h$ is out of gear, no seed will pass the seeding-wheels $l$, to be delivered to the spouts.

The operation of the machine is as follows: The hopper H being filled with seed, motion is communicated to the cultivator by means of the tongue E. The driving-wheel C, in its revolutions, gives motion to the shaft $h$ and seeding-wheels $l$, by the gears $d$ and $e$. The seeding-wheels receive the seed from the hopper through the openings $l^2$ of the blocks $n$, and distribute it on the ground between the bars, when the teeth $b$ cover it with earth. The bars are raised and lowered by the lever G.

Having thus fully described our invention, what we claim, and desire to secure by Letters Patent, is—

1. The combination of the hollow axle and end-piece of frame, arranged as set forth, to form a bearing and end-piece.

2. The spindle D, secured firmly in the hub of the driving-wheel, to form a double bearing for same.

In testimony that we claim the foregoing as our own, we affix our signatures in presence of two witnesses.

J. S. ROWELL,
IRA ROWELL.

Witnesses:
   THEODOR FUTH,
   CH. GEOLING.